US007797325B2

(12) United States Patent  (10) Patent No.: US 7,797,325 B2
So  (45) Date of Patent: Sep. 14, 2010

(54) LIGHTWEIGHT GENERIC REPORT GENERATION TOOL

(75) Inventor: Wai Kei So, Daly City, CA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 11/208,928

(22) Filed: Aug. 22, 2005

(65) Prior Publication Data

US 2007/0043689 A1    Feb. 22, 2007

(51) Int. Cl.
*G06F 7/00* (2006.01)
*G06F 17/30* (2006.01)

(52) U.S. Cl. .................. 707/752; 707/736; 707/741

(58) Field of Classification Search ........... 707/752, 707/741, 736
See application file for complete search history.

(56) References Cited

U.S. PATENT DOCUMENTS

| | | | | | |
|---|---|---|---|---|---|
| 6,160,549 | A * | 12/2000 | Touma et al. | .............. | 715/762 |
| 6,212,524 | B1 * | 4/2001 | Weissman et al. | ........... | 707/101 |
| 6,442,714 | B1 * | 8/2002 | Griffin et al. | .................. | 714/46 |
| 6,454,305 | B1 * | 9/2002 | Prottengeier | ............... | 280/805 |
| 6,507,855 | B1 * | 1/2003 | Stern | .......................... | 715/513 |
| 6,539,370 | B1 | 3/2003 | Chang et al. | .................... | 707/2 |
| 6,889,230 | B1 * | 5/2005 | Rogers | .................... | 707/104.1 |
| 6,920,608 | B1 * | 7/2005 | Davis | ......................... | 715/503 |
| 6,950,983 | B1 * | 9/2005 | Snavely | ...................... | 715/206 |
| 7,127,444 | B2 * | 10/2006 | Peake et al. | ..................... | 707/1 |
| 7,152,200 | B2 * | 12/2006 | Albert et al. | ................ | 715/500 |
| 2002/0038350 | A1 * | 3/2002 | Lambert et al. | ............ | 709/217 |
| 2002/0133488 | A1 * | 9/2002 | Bellis et al. | ..................... | 707/6 |
| 2003/0055724 | A1 * | 3/2003 | Battin et al. | .................. | 705/14 |
| 2003/0084062 | A1 | 5/2003 | Young et al. | ................ | 707/102 |
| 2003/0195873 | A1 * | 10/2003 | Lewak et al. | .................. | 707/3 |
| 2004/0044679 | A1 | 3/2004 | Chang et al. | ................ | 707/102 |
| 2004/0083092 | A1 * | 4/2004 | Valles | .......................... | 704/9 |
| 2004/0139042 | A1 * | 7/2004 | Schirmer et al. | ............... | 707/1 |
| 2004/0153465 | A1 * | 8/2004 | Singleton et al. | ............ | 707/100 |
| 2004/0186817 | A1 * | 9/2004 | Thames et al. | ................. | 707/1 |
| 2004/0205487 | A1 | 10/2004 | Albert et al. | ............ | 715/501.1 |
| 2004/0221233 | A1 * | 11/2004 | Thielen | ...................... | 715/530 |
| 2004/0225629 | A1 * | 11/2004 | Eder | ........................... | 706/46 |
| 2005/0004947 | A1 | 1/2005 | Emlet et al. | ............. | 707/104.1 |
| 2005/0039119 | A1 * | 2/2005 | Parks et al. | .................. | 715/515 |
| 2005/0171947 | A1 * | 8/2005 | Gautestad | ...................... | 707/5 |
| 2005/0228815 | A1 * | 10/2005 | Carus et al. | ................. | 707/102 |
| 2006/0014129 | A1 * | 1/2006 | Coleman et al. | ............ | 434/322 |
| 2006/0048096 | A1 * | 3/2006 | Jiang et al. | .................. | 717/115 |
| 2006/0085235 | A1 * | 4/2006 | Nguyen et al. | ................. | 705/7 |
| 2006/0143220 | A1 * | 6/2006 | Spencer, Jr. | ................. | 707/102 |
| 2006/0286518 | A1 * | 12/2006 | Yoder | .......................... | 434/236 |

* cited by examiner

*Primary Examiner*—Hexing Liu
*Assistant Examiner*—Kuen S Lu
(74) *Attorney, Agent, or Firm*—Hovey Williams LLP

(57) ABSTRACT

Methods for generating a dynamically sortable report from data independent of the original representative format of the data generally include accessing a plurality of files, parsing the accessed files, forming a vector utilizing the parsed files, generating a report from the formed vector, and dynamically sorting the report utilizing the formed vector and a sorting element associated with the report. Such methods reduce consumption of computing resources as a single static report may be generated, and later sorted or otherwise modified, without creating another static report or otherwise accessing the source of the report, such as a data repository.

14 Claims, 3 Drawing Sheets

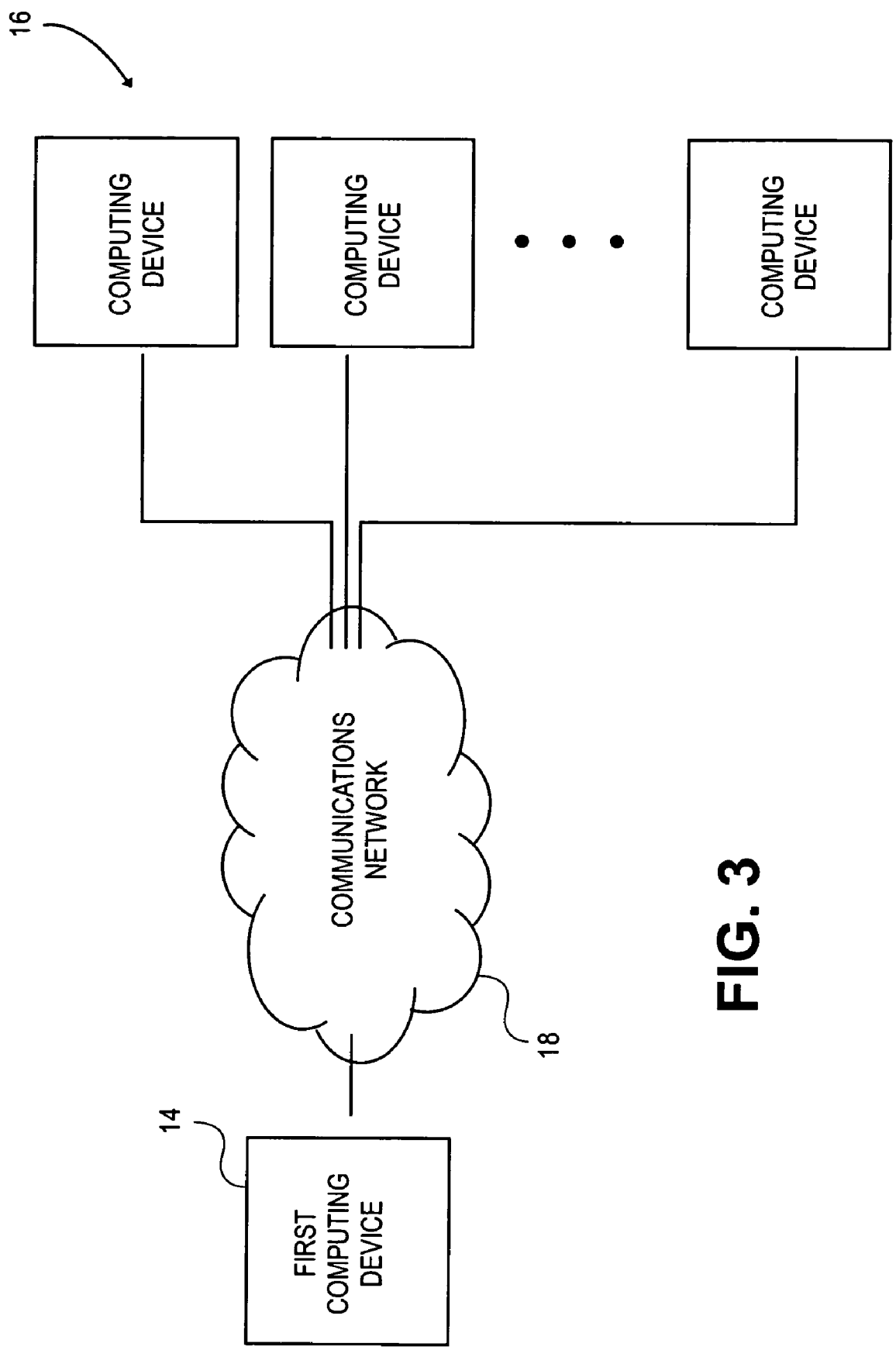

LIGHTWEIGHT GENERIC REPORT GENERATION TOOL

FIELD

The present teaching relates to methods and computer programs for generating a dynamically sortable report from data independent of the original representative format of the data.

BACKGROUND

With the costs of disks decreasing and the capacity of disks increasing, it is now possible to create data repositories that can store hundreds, thousands, or even millions of individual files. Additionally, due to the ever-increasing number of programs and file formats, data repositories may often store files of several different formats. Thus, the usage of data repositories to archive data including many files in many formats is increasing.

Additionally, organizations often desire to analyze information stored in data repositories in order to efficiently utilize the data, such as through data mining. For example, it is often desirable to generate a report summarizing data stored in a data repository for utilization in various aspects of business planning. Unfortunately, to access and analyze many files of several different formats stored in a data repository, inefficient methods must be employed that greatly increase in complexity with the amount of data analyzed.

Additionally, even if data stored in a repository may be accessed and analyzed, such use often strains the source of the repository, such as a computing device including a database, as the repository must be repeatedly accessed and queried to analyze the data stored therein. Thus, powerful computing devices must be utilized in order to limit strain on the underlying datasource, thereby increasing the cost and complexity of the data repository.

Due to the desire to limit the cost and complexity of data repositories, static reports are often generated weekly, monthly, quarterly, etc, to limit repository access and eliminate consumption of additional computing resources. However, static reports are often of little use, as static reports must be specific to a predefined data subset, such as the number of sales by a particular vendor on a particular date, that may not be easily regenerated or dynamically modified for data. Thus, separate static reports must be generated for each desired analysis, thereby increasing repository access and datasource strain and decreasing the utility of each static report.

SUMMARY

According to various embodiments, the present teachings involve methods for generating a report that solve the above-described problems.

Specifically, the present teachings involve methods for generating a report that may be dynamically sorted without requiring reloading of the data comprising the report and that may be generated independent of the original representative format of the data. Such methods reduce consumption of computing resources as a single static report may be generated, and later sorted or otherwise modified, without creating another static report or otherwise accessing the source of the report, such as a data repository. Further advantages will be apparent from the detailed description provided below.

In various embodiments, the methods of generating a report generally comprise accessing a data repository including a plurality of files; parsing each file utilizing a placeholder tag; forming a vector utilizing the parsed files; generating a report from the formed vector; and dynamically sorting the report utilizing the formed vector and a sorting element associated with the report.

In various embodiments, the methods may also generally include accessing a data repository including a plurality of files; converting accessed files represented by non-delimited flat files into delimited flat files; parsing each delimited file utilizing a placeholder tag provided by a template; forming a vector utilizing the parsed files and the template; generating a report from the formed vector and the template; storing the report on a first computing device and enabling a second computing device, coupled with the first computing device, to dynamically sort the report with a sorting element associated with the report without utilizing resources of the first computing device.

In various embodiments, a computer program product embodied on one or more computer-readable media may be employed to implement the methods of the present invention. The computer program product may generally comprise an access routine operable to access a data repository including a plurality of files; a parsing routine operable to parse each file utilizing a placeholder tag; a vector forming routine operable to form a vector utilizing the parsed files; a generation routine operable to generate a report from the formed vector; and a sorting routine operable to dynamically sort the report utilizing the formed vector and a sorting element associated with the report.

The computer program product may also include a converting routine operable to convert accessed files represented by non-delimited flat files to delimited flat files and a storing routine operable to store the report on a first computing device to enable a second computing device, coupled with the first computing device, to dynamically sort the report without utilizing resources of the first computing device.

It is understood that both the foregoing general description and the following description of various embodiments are exemplary and explanatory only and are not restrictive of the invention as claimed. The accompanying drawings, which are incorporated in and constitute a part of this specification, illustrate some embodiments, and together with the description serve to explain the principles of the embodiments described herein.

BRIEF DESCRIPTION OF THE DRAWINGS

The skilled artisan will understand that the drawings, described below, are for illustration purposes only. The drawings are not intended to limit the scope of the present teachings in any way.

FIG. 3 is a block diagram illustrating various computing devices and networks utilized by the exemplary method of FIGS. 1-2.

DESCRIPTION OF VARIOUS EMBODIMENTS

Reference will now be made in detail to some embodiments, examples of which are illustrated in the accompanying drawings. Wherever possible, the same reference numbers are used throughout the drawings to refer to the same or like parts.

Figure 1:
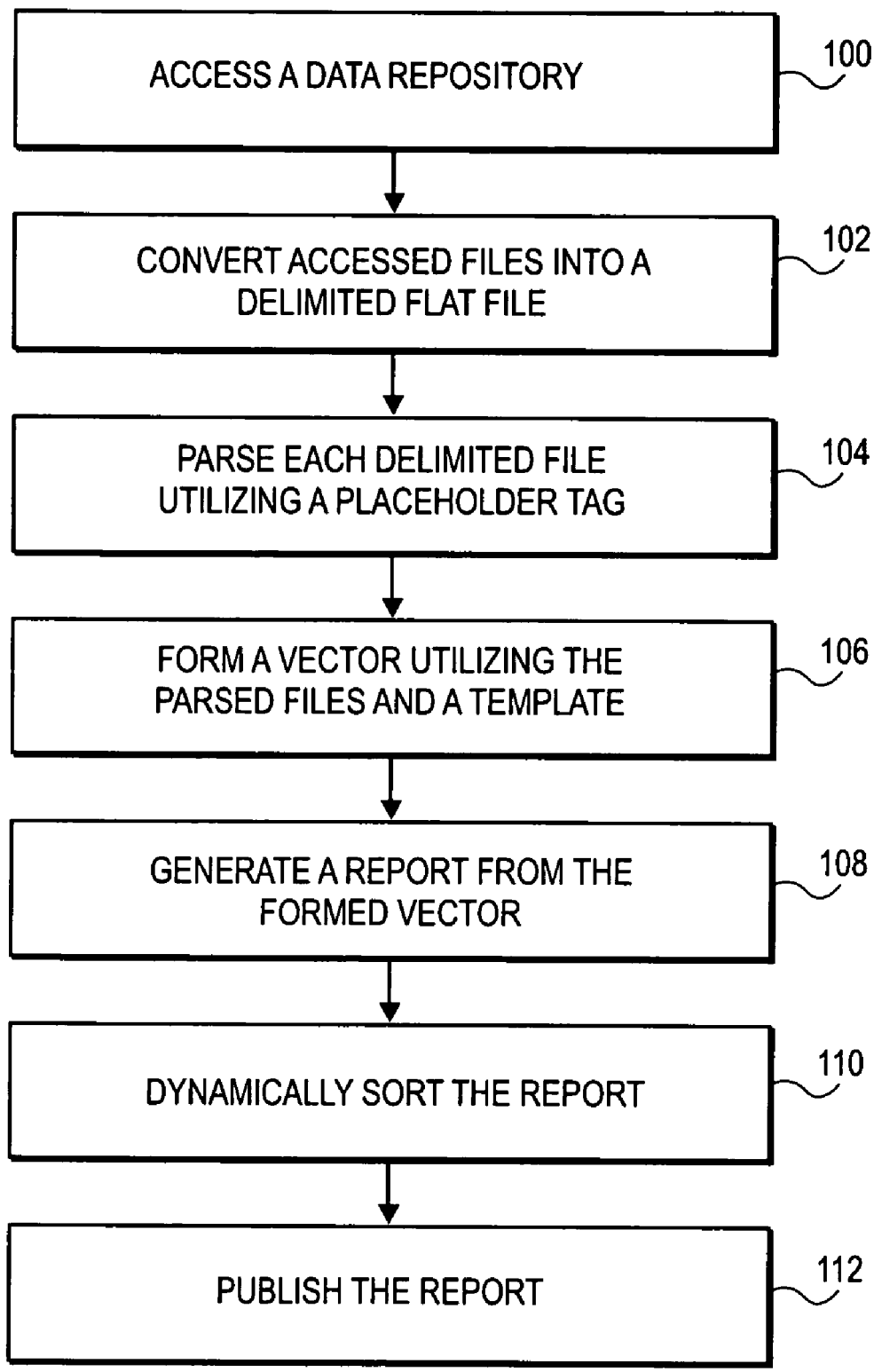
FIG. 1 is a flow chart illustrating an exemplary method for generating a report.
Figure 2:
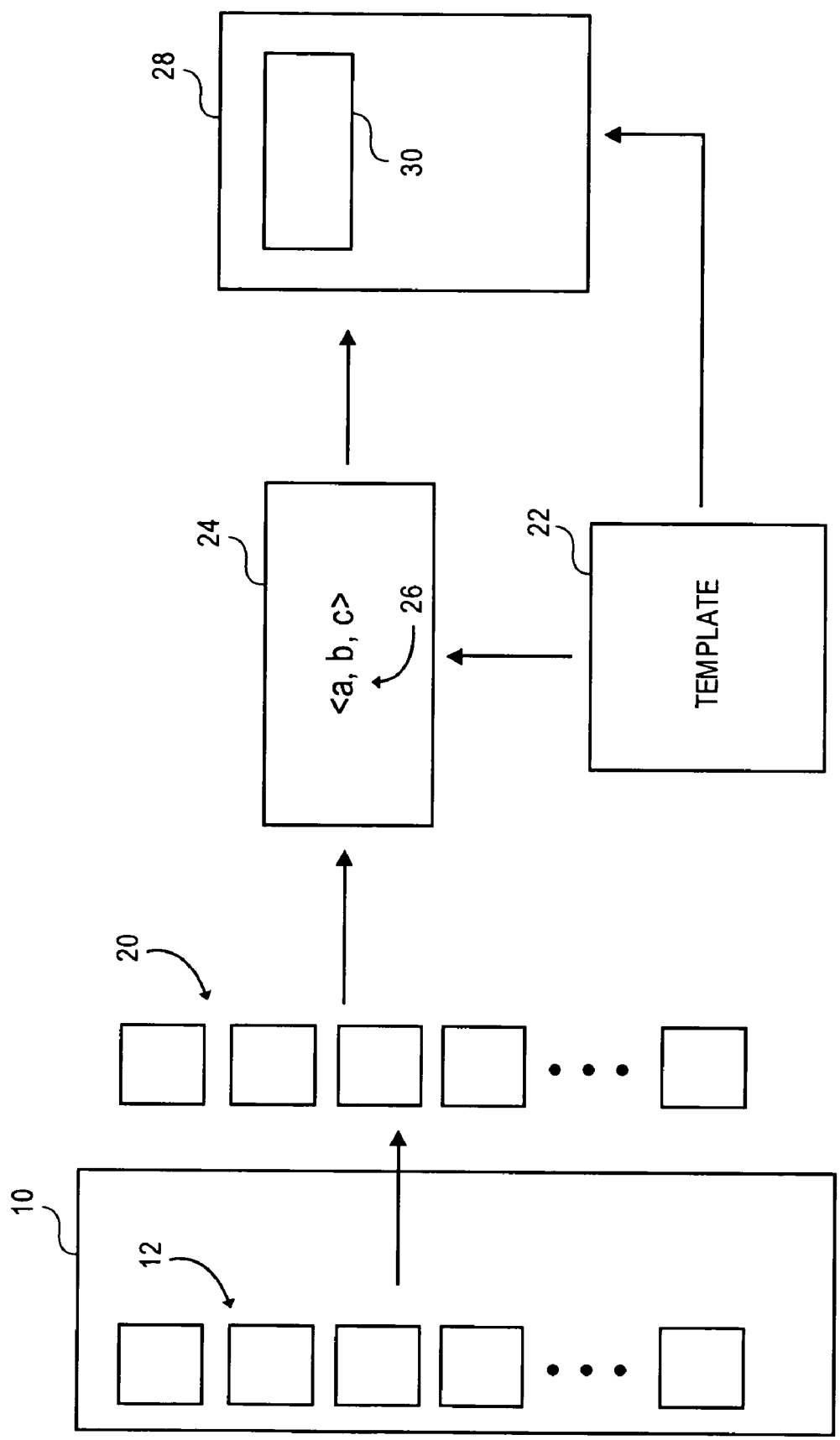
FIG. 2 is a block diagram illustrating various elements utilized by the exemplary method of FIG. 1.

Referring to FIGS. 1-3, the present invention involves a computer-implemented method for generating a report. Steps 100-112 in FIG. 1 outline an exemplary report generation scheme. The method described herein can be programmed and stored on a device readable by a standard computing device, such as a personal computer or computer network. Suitable program storage devices include, for example, compact discs (CD), digital video discs (DVD), internal computer hard drives, and external network hard drives. Similarly, the method described herein may be executed by a standard computing device or be separately executed by a plurality of computing devices residing on a computing network.

In step 100, a data repository 10 including data is accessed. The repository 10 is preferably a computer-readable storage medium and the data is preferably a plurality of files 12. The repository 10 may be included within a first computing device 14, such as a computer, a server, a redundant array of independent disks (RAID) system, a computing network, combinations thereof, or any generally conventional computing or data storage device.

The repository 10 may be accessed locally by programs and/or code segments resident within the first computing device 14, and/or the repository 10 may be accessed remotely by programs and/or code segments resident with one or more second computing devices 16 that may be coupled with the first computing device 14 through a communications network 18 such as a local area network (LAN), a wide-area network (WAN), a serial network, the Internet, etc.

Thus, the repository 10 may be accessed locally through functionality provided by the first computing device 14 or and/or the repository 10 may be accessed remotely through the communications network 18. As such, various code segments comprising at least a portion of the present invention may be stored and executed by the first computing device 14 and/or various code segments may be stored and executed by the second computing device 16. As is described below in detail, it may be desirable to utilize the second computing devices 16 to execute various code segments to limit consumption of resources by the first computing device 14, which may house at least a portion of the repository 10.

The plurality of files 12 may represent data corresponding to various attributes. For example, the files 12 may include databases, relational databases, spreadsheets, text files, word processing files, compressed or uncompressed archives, any other grouping of data operable to represent data, and/or combinations thereof. The files 12 stored in the repository 10 need not be represented in any particular format. Thus, the files 12 may be represented by various formats, including but not limited to the files 12 may be represented by various formats associated with software programs, including but not limited to IBM DB2 by IBM Corp in Armork, N.Y., Oracle database by Oracle Corp in Redwood Shores, Calif., Microsoft Excel by Microsoft Corp in Redmond, Wash. and/or any other formats utilized to store data, including non-delimited and delimited flat file formats.

In step 102, the various accessed files 12 may be converted into one or more delimited flat files 20. Each accessed file 12 may be converted into a separate delimited flat file 20 or various accessed files 12 may be converted into various delimited flat files 20. Step 102 may be desirable in situations wherein data is stored within the files 12 in a manner that may not be easily accessed or manipulated. For example, in situations where a file includes data represented by relational database wherein data is not stored according to predetermined and fixed fields, it may be desirable to convert the relational data into a delimited flat file wherein the data may be more easily identified in steps 104-106. Only accessed files 12 stored in a non-delimited flat file formats need be converted into one or more delimited flat files 20. Thus, in situations where the files 12 include data already in a delimited flat-file relationship, such as a common text table or a spreadsheet, step 102 need not necessarily be performed.

Preferably, the delimited flat files 20 are arranged such that data is grouped within the flat files 20 by row and column. For example, each row of a particular flat file may correspond to a particular group, while each column of the particular flat file may correspond to a particular group attribute. Such an arrangement may be desirable in various situations as it enables data to be easily identified and extracted from the flat files 20 by column and row.

The files 12 may be converted into delimited flat files 20 utilizing various algorithms and methods. For example, conventional relational database suites, such as IBM DB2 related software, often include methods for converting relational databases to a flat-file format. Similarly, other methods may be utilized for converting other files into delimited flat files, including automated data extraction methods, text and data recognition methods, manual conversion of data by a user, etc.

In step 104, the files 12, or preferably the delimited flat files 20 if step 102 is performed, are parsed utilizing a placeholder tag. Specifically, the flat files 20 are preferably parsed utilizing the placeholder tag such that the placeholder tag separates each grouping of data. For example, if a file includes data arranged in columns and rows, such that each row corresponds to a particular group and each column corresponds to a particular group attribute, the file may be parsed such that the placeholder tag is placed between each group attribute within each row to separate various data corresponding to the attributes and rows. Furthermore, the placeholder tag may be positioned between rows of data to enable each row to be easily identified.

Step 104 may be performed simultaneously or concurrently with step 102, and thus need not be sequentially performed, to efficiently convert accessed files 12 into parsed delimited flat files 20 as various tools may be utilized to both convert and parse the accessed files 12. For example, a single code segment, or a single software suite, may be utilized to generally simultaneously or concurrently perform steps 102 and 104 in an efficient manner. However, steps 102 and 104, in addition to steps 106-112, may be performed jointly or separately in any order to achieve various desired results.

The placeholder tag may be any identifying element, such as a character or a string of characters, which may be identified within the files 20 to separate data. Thus, the placeholder tag may be a space, a tab-spacing, a single American Standard Code for Information Interchange (ASCII) character, such as a @, $, |, and/or a string of characters, such as "tag", etc. The placeholder tag and flat files 14 may be utilized to create parsed files that are separate from the flat files 20, or the placeholder tag may be utilized to parse the flat files 20 such that the flat files 20 include both delimited data and the placeholder tag.

Additionally, the placeholder tag may be retrieved from a template 22. The template 22, as described below, may include various data operable to be utilized by the present invention, including the placeholder tag. The template 22 may be distinct from various code segments that perform various elements of the present invention or the template 22 may be integral with various code segments that perform various elements of the present invention. Utilization of the template 22 may be desirable as it enables the placeholder tag to be easily defined, modified, or identified for utilization with the present invention by users or computing devices.

In step 106, the parsed files, such as the parsed delimited flat files 20, are utilized to form a vector 24. The vector 24 is comprised of a plurality of components 26, wherein each component corresponds to data parsed in step 104. For example, if the parsed data of step 104 includes three parsed elements, the vector 24 may include three vector components 26 each corresponding to each parsed data element.

Preferably, the parsed data is included within at least one of the delimited flat files, discussed above, such that parsed data is arranged by column and row. In such a situation, the vector 24 preferably comprises a plurality of vectors, such that the vector 24 is vector of vectors, wherein the vector 24 includes a vector for each row of data. For example, if the parsed data of step 104 includes two rows each having three parsed elements, such as row A having elements A1, A2, and A3 and row B having elements B1, B2, and B3, the vector 24 may includes a first vector A<A1, A2, A3> and a second vector B<B1, B2, B3>.

In various embodiments, the vector 24 may be formed utilizing the template 22 and the parsed data from the flat files 20. Specifically, the template 22 may be utilized to determine the arrangement of the vector 24, such as the position of the vector components 26 within the vector 24 and the relationship between the vector components 26 and parsed data. Additionally, the template 22 may define which parsed data to include within the vector 24, the number of vectors to include within the vector 24, from which parsed files, flat files 20, or files 12, to form the vector 24, etc. Furthermore, the template 22 and associated vector format may be dynamic and/or user-definable to enable the vector 24 to include various desired parsed data for use with the present invention.

In step 108, a report 28 is generated utilizing the formed vector 24. The report 28 includes various data from the files 12 that may be analyzed, interpreted, viewed, disseminated, or otherwise utilized for a desired purpose. Thus, the report 28 may present a generally conventional interface for viewing, sorting, arranging, and otherwise utilizing various data from the files 12.

Additionally, the template 22 may be utilized to present or generate the report 28 in a desired format, such as by defining which vector data to display, the position of displayed data, the arrangement of presented data, etc. Utilization of the template 22 may be desirable to enable computing devices and/or users to create, modify, or identify the report 28 and the format of the report 28.

In step 110, the report 28 may be dynamically sorted. The utilization of the formed vector 24 to generate at least a portion of the report 28 enables the report 28 to be dynamically sorted by a sorting element 30 without requiring reloading of the entire report 28 itself. For example, in various situations the report 28 may include many thousands, or even millions, of vector components 26 each corresponding to various data. Such a large amount of data requires computational resources, such as memory and processing power, to load for access. By enabling the report 28 to be dynamically sorted, such as by rearranging data or sorting data according to various desired fields without reloading or reassessing data, such as the files 12 or delimited flat files 20, consumption of various computation resources is reduced, such as a memory and computing resources of the various utilized computing devices.

For example, the second computing device 16 may access the first computing device 14 to retrieve various files 12, or flat files 20, for generation of the report 28 utilizing the vector 24. Alternatively or additionally, the second computing device 16 may access the first computing device 14 to retrieve a previously generated report 28 and sorting element 30. After retrieval of the files 12, flat files 20, report 28, and/or sorting element 30, the second computing device 16 is not required to access the first computing device 14 again to sort, rearrange, or otherwise modify the report 28, as the sorting element 30 is operable to utilize the vector 24 to sort various data without reloading the report 28.

Similarly, utilizing of the vector 24 and sorting element 30 reduces consumption of computing resources by the second computing device 16 as the second computing device 16 is not required to reload the report 28 to sort, rearrange, or otherwise modify the data presented in the report 28. The report 28 and sorting element 30 may be integral with each other or the report 28 and sorting element 24 may be otherwise associated, such as by linking through code segments or other similar association methods.

In various embodiments, the report 28 may be presented in hypertext markup language (HTML) format to facilitate access and viewing of the report 28 utilizing various conventional and readily available software tools, such as a web browser. Additionally, in various embodiments, the sorting element 30 is preferably javascript that may be associated with the report 28, such as through HTML, to facilitate access of both the report 28 and the sorting element 30.

Such a configuration of the report 28 and sorting element 30 may be desirable as it facilitates sorting, rearrangement, and other modification of the presented data by enabling the javascript sorting element 30 to sort the data utilizing the vector 24 without reloading the HTML report 28, thereby reducing consumption of resources by the computing devices 14, 16, and enabling the generation of a static report that is easily sortable. Similarly, utilizing of the vector 24 and sorting element 28 enables only one static report to be generated for any set of data due to the ability to dynamically sort the report 28.

In various embodiments, the report 28 may include one or more HTML <div> tags that may be utilized to populate data from the vector 24 for display within the report 28. As used herein, a <div> tag defines a division and/or section within a document such that series of <div> tags represent logical divisions of content within a document. A web browser, or any other HTML or other mark-up language editor or displayer, may process the <div> tag and associated vector data to display various data as indicated in the vector 24. To sort the data, the sorting element 30 recreates one or more of the <div> tags based on various sorting criteria provided by a user or a computing device. For example, the sorting element 30 may utilize javascript to sort the vector 24, or data presented within the vector 24, as desired based on the sorting criteria. Recreation of the <div> tag by the sorting element 30 enables data within the report 28 to be sorted without reloading the report 28, such as the HTML file comprising the report 28, itself.

In step 112, the report 28 may be published to enable access of the report 28 by the various second computing devices 16 through the communications network 18. For example, the files 12, and/or delimited flat files 20, the report 28, and/or the sorting element 30, may be provided by the first computing device 14, such as a data server for access by the second computing devices 16, such as client devices.

Additionally, only the report 28 and associated sorting element 24 need be published, without requiring publication of the files 12 or delimited flat files 14, to limit the resources required for publication. Such publication of the report 28 and sorting element 24 enables the report 28 to be accessed and sorted by the various second computing devices 16 without requiring the second computing devices 16 to access or communicate with the first computing device 14 to sort or modify data originally presented within the report. Furthermore, publication of the report 28 by the first computing device 14 may only occur once as the second computing devices 14 may sort and/or modify data presented in the report 28 without accessing the first computing device 14.

Methods and products consistent with the present teachings can be implemented in hardware, software, firmware, or a combination thereof. In various embodiments, the invention is implemented with a computer program. The computer program and equipment described herein are merely examples of a program and equipment that may be used to implement the present invention and may be replaced with other software and computer equipment without departing from the scope of the present teachings.

The computer program of the present invention is stored in or on a computer-readable medium residing on or accessible by a host computer for instructing the host computer to implement the method of the present invention as described herein. The computer program preferably comprises an ordered listing of executable instructions for implementing logical functions in the host computer and other computing devices coupled with the host computer. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

An ordered listing of instructions comprising the computer program of the present invention will hereinafter be referred to simply as "the program" or "the computer program." It will be understood by those skilled in the art that the program may comprise a single list of various types of machine readable instructions or two or more separate lists, and may be stored on a single computer-readable medium or multiple distinct media. In the context of this application, a "software object" is a programming unit that groups together a data structure (e.g., instance variables) and the operations (e.g., methods) that can use or affect that data.

In the context of this application, a "computer-readable medium" can be any means that can contain, store, or communicate the program for use by or in connection with the instruction execution system, apparatus, or device. The computer-readable medium can be, for example, but not limited to, an electronic, magnetic, optical, electro-magnetic, or semi-conductor system, apparatus, or device. More specific, although not inclusive, examples of the computer-readable medium would include the following: a portable computer diskette, a random access memory (RAM), a read-only memory (ROM), an erasable, programmable, read-only memory (EPROM or Flash memory), and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A computer readable medium encoded with code segments executable by a first computing device for generating, storing, and sorting an HTML report, wherein the computer readable medium is coupled with a memory and the first computing device and comprises computing resources, the computer readable medium comprising:

an access-code segment for accessing a data repository including a plurality of files;

a conversion code segment for converting the plurality of files represented by non-delimited flat files into delimited flat files;

a parsing code segment for defining a plurality of parsed data elements by parsing at least one of the plurality of files by inserting at least one placeholder tag in at least one of the plurality of files to separate groupings of data;

a vector forming code segment for forming a vector corresponding with the plurality of files, wherein the vector includes a plurality of vectors each corresponding to a row of parsed data and at least one of the plurality of vectors contains a data element defined by a template and chosen from among the plurality of parsed data elements;

a generation code segment for generating the HTML report from the formed vector and the template; and a reporting code segment for storing the HTML report in the memory and prompting a second computing device to dynamically sort the HTML report with a javascript sorting element associated with the HTML report without utilizing the computing resources of the first computing device; without using the computer readable medium, the non-delimited flat files or the delimited flat files; and without reloading the HTML report, wherein the HTML report includes a <div> tag corresponding to the formed vector and the javascript sorting element recreates the <div> tag to dynamically sort the HTML report.

2. The computer readable medium of claim 1, wherein the template is an HTML file.

3. The computer readable medium of claim 1, wherein the placeholder tag is an ASCII character.

4. The computer readable medium of claim 1, wherein the plurality of files are represented in a plurality of different file formats.

5. A method of generating an HTML report, the method comprising:

accessing a data repository including a plurality of files;

converting the accessed files represented by non-delimited flat files into delimited flat files;

parsing at least one of the accessed files utilizing a placeholder tag to insert the placeholder tag in the at least one of the accessed files to separate groupings of data and defining a plurality of parsed data elements;

forming a vector utilizing the parsed files, wherein the vector includes a plurality of vectors each corresponding to a row of parsed data and at least one of the plurality of vectors contains a data element defined by a template and chosen from among the plurality of parsed data elements;

generating the HTML report from the formed vector; and storing the HTML report on a first computing device and using a second computing device, coupled with the first computing device, to dynamically sort the HTML report with a javascript sorting element associated with the HTML report without utilizing resources of the first computing device, without using the accessed files, and without reloading the HTML report wherein the HTML report includes a <div> tag corresponding to the formed vector and the javascript sorting element recreates the <div> tag to dynamically sort the HTML report.

6. The method of claim 5, wherein the HTML report is generated from the formed vector and a template.

7. The method of claim 6, wherein the template is a HTML file.

8. The method of claim 5, wherein the placeholder tag is an ASCII character.

9. The method of claim 5, wherein the plurality of files are represented in a plurality of different file formats.

10. The method of claim 5, further including publishing the HTML report over a communications network and dynamically sorting the report using a plurality of computing devices coupled with the communications network.

11. A computer program product embodied on one or more physical computer-readable media and coupled with a first computing device, the computer program product comprising:

an access routine executed on the first computing device that accesses a data repository including a plurality of files;

a parsing routine that parses each file utilizing a placeholder tag and defines a plurality of parsed data elements;

a vector forming routine that forms a vector utilizing the parsed files wherein the formed vector includes a plurality of vectors each corresponding to a row of parsed data and at least one of the plurality of vectors contains a data element defined by a template and chosen from among the plurality of parsed data elements;

a generation routine that generates an HTML report from the formed vector; and a sorting routine that dynamically sorts the HTML report utilizing the formed vector and a javascript sorting element associated with the HTML report on a second computing device without using any of the plurality of files, any resources of the first computing device, and without reloading the HTML report, wherein the HTML report includes a <div> tag corresponding to the formed vector and the javascript sorting element recreates the <div> tag to dynamically sort the HTML report.

12. The program product of claim 11, wherein a template is utilized to supply the placeholder tag and to form the vector.

13. The program product of claim 11, further including a converting routine that converts the accessed files represented by non-delimited flat files to delimited flat files and parses each delimited flat file utilizing the placeholder tag.

14. The program product of claim 11, further including a storing routine for storing the HTML report on the first computing device to enable the second computing device, coupled with the first computing device, to dynamically sort the HTML report without utilizing resources of the first computing device.

* * * * *